July 2, 1940.　　　　H. W. STRUCK　　　　2,206,586

APPARATUS FOR OPERATING VEHICLE CONTROLS

Filed June 5, 1939

INVENTOR
Henry W. Struck
BY Spear, Rawlings & Spear
ATTORNEYS

Patented July 2, 1940

2,206,586

UNITED STATES PATENT OFFICE 2,206,586

APPARATUS FOR OPERATING VEHICLE CONTROLS

Henry W. Struck, Boston, Mass.

Application June 5, 1939, Serial No. 277,358

15 Claims. (Cl. 192—.01)

My present invention relates to a novel control for motor vehicles and the like and involves certain improvements on the motor vehicle control as set forth in my co-pending application, Serial No. 211,555, filed June 3, 1938.

My control system as set forth in my copending application relates to the control of power employed to actuate the brakes and the clutch from a centralized control, preferably the conventional accelerator or throttle valve operating lever. The control permits the brakes to be engaged automatically when the throttle valve is closed and provides for the automatic disengagement of the clutch when the brakes are engaged and when the speed of the motor vehicle has been reduced to a predetermined minimum. Preferably, automatic disengagement is likewise predicated on the vehicle being in gear.

While the control thus broadly outlined has many advantages, I have found that under certain conditions, a certain degree of manual control is desirable in order to render my device sufficiently flexible for all operating conditions. This results from the fact that the release of the brakes and the engagement of the clutch are automatically effected so that the clutch cannot become engaged until the brakes are released. Under some conditions, it is desirable to follow the conventional practice of permitting some degree of clutch engagement before the brakes are released. For example, I have found that with the control set forth in my co-pending application that under certain conditions, such as when starting a vehicle on an upgrade, it is necessary to use the hand brake to prevent the vehicle from rolling backwards if conventional driving practices are to be followed.

Because of the rather wide range of conditions that may be encountered in starting from rest, I have found that there is no simple and acceptable way of overcoming this problem automatically. For that reason, I have provided means operated coincidentally with the clutch pedal to permit the operator to meet the wide range of conditions in a conventional manner rendering the automatic operation of the clutch impossible.

Because power is employed to operate the clutch, I have also employed means by which the clutch can be operated by means of a control on the gear shift lever arranged so that the gear shift and clutch operation are centralized.

In accordance with my invention as set forth in my co-pending application, automatic clutch disengagement becomes possible whenever the brakes are applied to any degree. For that reason, it is an essential of my present invention that the control of clutch operation by the operator from the clutch pedal or from the gear shift lever be operable regardless of whether or not the brakes are applied.

This permits the brakes and the clutch to be automatically actuated and it likewise permits the brakes to be actuated independently of the clutch and the clutch to be operated independently of the operation of the brakes if desired.

Thus, I am able to provide a control by which the operation of motor vehicles is subjected to an automatic control adaptable to a wide range of conditions, but which may be subjected to manual control to render it adaptable to all operating conditions.

In the drawing I have shown an embodiment of my invention from which its several features and advantages will be readily apparent.

Figure 1:
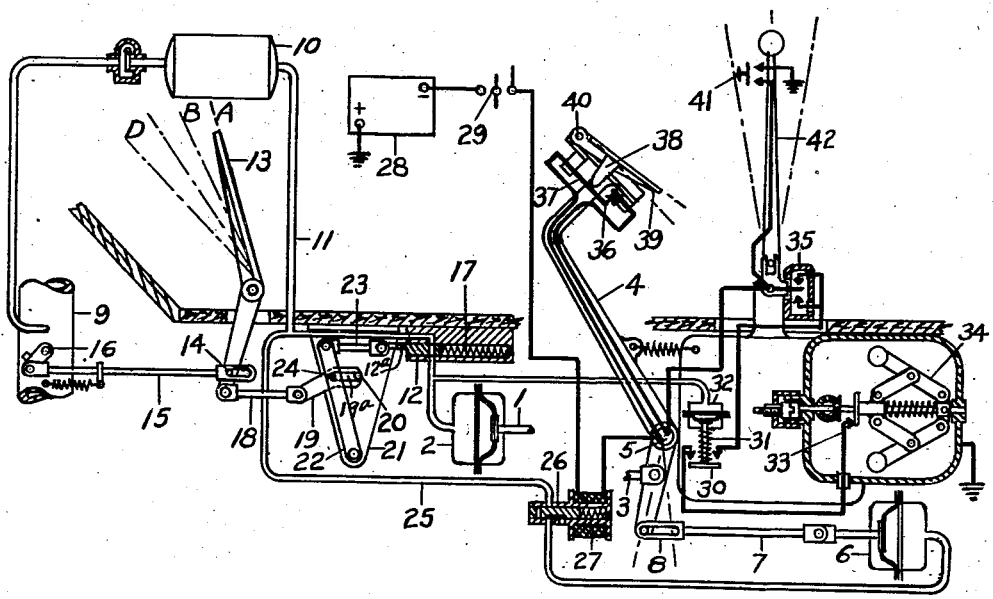
Fig. 1 is a schematic partly sectioned view of my invention.
Figure 2:
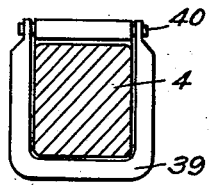
Fig. 2 is a fragmentary plan view of the clutch pedal control.

In Fig. 1, I have indicated at 1 a brake rod operated by a diaphragm unit 2 and at 3 a clutch rod. I have shown the clutch pedal 4 pivotally mounted at 5 in control of the clutch rod 3. The clutch rod 3 may be actuated by the pedal 4 or by a diaphragm unit 6. The link 7 operatively connected to the diaphragm unit 6 and the clutch pedal 4 have a slotted connection 8 to permit the clutch to be manually operated without unnecessary movement of the diaphragm.

Although, as is more fully set forth in my co-pending application, Serial No. 211,555, the operation of the brakes and the clutch is effected by any suitable power medium, vacuum is used as the operating power in the description of my present apparatus. At 9, I have indicated the intake manifold and at 10 a suitable tank from which the conduit 11 is in communication with the diaphragm unit 2 and controlled by the valve 12.

The valve 12 is operated by the accelerator pedal or manually operable throttle 13 which has a slotted interconnection 14 with the throttle valve link 15 to permit the throttle to move from the position B in which the throttle valve 16 is closed into the position A in which the valve 12 is opened so that the brakes are actuated. The valve 12 is under the control of a spring 17 and is cut away as at 12$^a$ so that when the accelerator pedal 5 is depressed, the cut-away 12$^a$ connects the diaphragm unit 2 to atmosphere.

The throttle 13 is pivotally connected to a link pivotally connected to a crank 19 to slidably engage the pivot 20 on the support 21. A lever 22 is pivotally mounted on the support 21 and is pivotally connected to the link 23 in control of the valve 12, the lever 22 and the crank 19 having a pivotal interconnection 24 over the rear of the slot 19a on the crank 19 so that when the accelerator 13 is depressed intermediate the positions B and D, the link 18 is moved, moving the lever 22 until the pivot 24 registers with the pivot 20 and thereafter the crank 19 rotates around the pivot 20 so that the pivot 20 in the slot in the crank 19 prevents the spring 17 from exerting any resistance to the movement of the accelerator pedal 13.

A conduit 25 is connected to the conduit 11 intermediate the valve 12 and the tank 10 and communicates with the diaphragm unit 6. The conduit 25 is controlled by a valve 26 preferably operated by the solenoid 27, the circuit to which includes the battery 28 and the ignition switch 29.

As set forth in my co-pending application, the brakes of a motor vehicle are controlled by the accelerator pedal 13 when actuated by the spring 17. In order that the clutch may be disengaged automatically under suitable circumstances, the automatic disengagement of the clutch is possible only when the brakes are applied and a predetermined vehicle speed is attained. Preferably, automatic disengagement is also possible only when the vehicle is in gear.

To accomplish this result, I provide in the circuit to the solenoid a switch 30 normally held open by the spring 31, but adapted to be closed by the diaphragm unit 32 connected to the conduit 11 intermediate the valve 12 and the diaphragm unit 2 so that the circuit cannot be closed until the valve 12 is open. A switch 33 controlled by the governor 34 permits the circuit to the solenoid 27 to be closed at a predetermined low vehicle speed. Attention is also directed to the switch 35 in the circuit to the solenoid 27 adapted to be closed when the drive and driven shafts (not shown) are connected for forward or reverse drives.

In accordance with my present invention, the circuit to the solenoid 27 is subjected to manual control in order to render the operation of my invention fully adaptable to all possible driving conditions.

Because I have found that there is no simple and satisfactory automatic way of making the clutch engage satisfactorily for all conditions when starting the vehicle from rest, I have provided means whereby the circuit may be manually opened to permit manual operation of the clutch pedal 4. Preferably, this result is accomplished coincidentally to the manual operation of the clutch pedal 4 and in order to accomplish this result, I provide on the clutch pedal 4 a normally closed spring switch 36, the spring arm 37 which is adapted to be opened by the insulated arm contacting portion 38 of the tread switch member 39 hinged to the pedal 4 as at 40. When the operator places his foot on the clutch pedal 4, the portion 38 of the tread member 39 moves the arm 37 opening the switch 36 and making automatic operation of the clutch impossible. Thus, the clutch may be manually operated by the operator when necessary as the service brakes are released by movement of the accelerator pedal 13. It will be appreciated that the switch 36 may be of any conventional construction provided that its resiliency is sufficient to close the circuit and to raise the tread member 39 when the operator's foot is removed.

Because power operated means are employed to disengage the clutch, I employ a switch 41 mounted on the gear shift lever 42 to permit the operator to use the power operated means to operate the clutch when a gear shift is to be made. The switch 41 is of the type normally held open by a spring and has one terminal grounded and it and the switch 36 are connected into the electric circuit intermediate the solenoid 27 and the switch 35. Preferably, the switch 36 is disposed in the circuit intermediate the solenoid 27 and the switch 41 in order that none of the other switches may be effective when the clutch is manually operated. It is to be noted that the manual control of the clutch through the switches 36 and 41 does not impose any limitations on the automatic operation of the brakes.

While the operation of the brakes and the clutch may be entirely automatic, the clutch may be controlled by the operator in a conventional manner as long as the switch 36 is open. This manual control does not affect the automatic operation of the brakes which are not released until the accelerator pedal 13 is moved from the position A to the position B.

Because there is no necessity for maintaining the clutch disengaged by the power operated diaphragm unit 6 when the gear shift lever 42 is neutrally positioned, I preferably employ the switch 35 adapted to be closed whenever the gear shift lever 42 is positioned for any forward or reverse drive. Thus, when the gear shift lever 42 is neutrally positioned automatic disengagement of the clutch is impossible.

The switch 41, however, permits the clutch to be disengaged at any time unless the clutch pedal 4 is manually operated to render all the other switches ineffective through coincidental operation of the switch 36. Thus, when the gear shift lever 42 is being moved in shifting gears and the switch 41 is employed to disengage the clutch, means are employed for disengaging the clutch under circumstances in which the automatic disengagement of the clutch is impossible, although when any shift is completed and the switch 41 is no longer manually operated the desired possibility of automatic clutch disengagement is restored.

The relation of the switches 36 and 41 are, therefore, of considerable importance in the most desirable embodiment of my invention and with the switch 36 operated with the pedal 4, my control is adapted to meet all possible operating conditions.

In accordance with my present invention, the automatic operation of the brakes and the clutch by a common control, also employed to actuate the throttle valve, may be subjected to a manual domination under circumstances where automatic operation of the clutch is not consistent with desired operating conditions and where the ease of operation may be increased by the manual control of the power available automatically to increase the ease and safety of motor vehicle operation.

What I therefore claim and desire to secure by Letters Patent is:

1. In a motor vehicle control system having a transmission, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, and means to connect said second power operable means to said source, operating means for said last named connecting means, control means to render said last named operating means operative when said first power operable means is connected to said source, and a manual control operable coincidentally to the manual operation of said clutch pedal to render said controlling means ineffective.

2. In a motor vehicle control system having a transmission including a gear shift lever, a throttle actuating member, brakes, a clutch, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, operating means for said last named connecting control means, means to render said last named operating means operative when said first power operable means is connected to said source, and a manual control on said gear shift lever adapted to permit said last named operating means to be operative when said first power operable means and said source are not connected.

3. In a motor vehicle control system having a transmission including a gear shift lever, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, operating means for said last named connecting control means, means to render said last named operating means operative when said first power operable means is connected to said source, a manual control operable coincidentally to the manual operation of said clutch pedal to render said actuating means ineffective, and a manual control on said gear shift lever adapted to permit said last named operating means to be operative when said first power operable means and said source are not connected.

4. In a motor vehicle control system having a transmission, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, a solenoid to operate said last named connecting means, an electric circuit including said solenoid, a normally open switch in said circuit, means to close said switch when said first power operable means are connected to said source, and a second switch in said circuit, said switch being normally closed, and means actuated when said clutch pedal is manually operated to open said second switch to render said first switch ineffective.

5. In a motor vehicle control system having a transmission, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, a solenoid to operate said last named connecting means, an electric circuit including said solenoid, a normally open switch in said circuit, means to close said switch when said first power operable means are connected to said source, speed responsive means to complete said circuit when the vehicle speed reaches a predetermined minimum, and a second switch in said circuit, said switch being normally closed, and means actuated when said clutch pedal is manually operated to open said second switch to render said first switch and said speed responsive means ineffective.

6. In a motor vehicle control system having a transmission, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, a solenoid to operate said last named connecting means, an electric circuit including said solenoid, a normally open switch in said circuit, means to close said switch when said first power operable means are connected to said source, a tread member pivotally carried by said clutch pedal, a second switch in said circuit, resilient means normally maintaining said second switch closed, and said tread member including a portion in contact with said switch so that whenever said clutch pedal is manually operated said second switch is opened and said first switch is rendered ineffective.

7. In a motor vehicle control system having a transmission, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, and means to connect said second power operable means to said source, operating means for said last named connecting means and means to actuate said last named operating means when said first power operable means is connected to said source, first manually operable means to render said actuating means ineffective and second manually operable means to render said last named operating means operative, both of said manually operable means being effective whether or not said first power operable means and said source are connected.

8. In a motor vehicle control system having a transmission, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, and means to connect said second power operable means to said source, operating means for said last named connecting means, and control means to render said last named operating means operative when said first power operable means is connected to said source, speed responsive means to actuate said last named operating means when the vehicle speed has reached a predetermined minimum, first manually operable means to render both of said controlling means ineffective and second manually operable means to render said last named operating means operative, both of said manually operable means being effective whether or not said first power operable means and said source are connected and regardless of the vehicle speed.

9. In a motor vehicle control system having a transmission, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first named connecting means to cause said connecting means to be actuated during said limited movement only, means to connect said second power operable means to said source, operating means for said last named connecting control means, means to render said last named operating means operative when said first power operable means is connected to said source and a predetermined minimum vehicle speed is attained, first manually operable means to render said actuating means ineffective and second manually operable means to render said last named operating means operative, both of said manually operable means being effective independently whether or not said first power operable means and said source are connected and regardless of vehicle speed, and said second manually operable means being ineffective when operated when said first manually operable means are actuated.

10. In a motor vehicle control system having a transmission including a gear shift lever, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, a solenoid to operate said last named connecting means, a circuit including said solenoid, a normally closed switch in said circuit, and a pair of parallel circuits, a normally open switch in each of said parallel circuits, means to close one of said normally open switches when said first power operable means are connected to said source, the other of said switches being mounted on said gear shift lever, and means to open said normally closed switch coincidentally to manual operation of said clutch pedal.

11. In a motor vehicle control system having a transmission including a gear shift lever, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, a solenoid to operate said last named connecting means, a circuit including said solenoid, a normally closed switch, and a first and second parallel circuit, a normally open switch in said first and second parallel circuits, and a second switch in said first parallel circuit, and speed responsive means opening said second switch when the vehicle speed exceeds a predetermined minimum, means to close said normally open switch in said first parallel circuit when said first power operable means are connected to said source, the normally open switch in said second parallel circuit being mounted on said gear shift lever, and means to open said normally closed switch coincidentally to the manual operation of said clutch pedal.

12. In a motor vehicle control system having a transmission and a transmission control lever, a throttle actuating member, brakes, a clutch, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, operating means for said last named connecting means, and control means to render said last named operating means operative when said first power operable means is connected to said source and the vehicle speed is at a predetermined minimum, means rendering said actuating means ineffective when said transmission lever is neutrally positioned, a manually operable control to render said last named operating means operative independently of the operation of said first power operable means, the vehicle speed, and of the position of said transmission control lever.

13. In a motor vehicle control system having a transmission and a transmission control lever, a throttle actuating member, brakes, a clutch having a manually operable pedal, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, operating means for said last named connecting means, and control means to render said last named operating means operative when said first power operable means is connected to said source and the speed of the vehicle is at a predetermined minimum, means rendering said actuating means ineffective when said transmission lever is neutrally positioned, a manually operable control to render said last named operating means operative independently of the operation of said first power operable means, the vehicle speed, and of the position of said transmission control lever, and means operable coincidentally to the manual operation of said clutch pedal to render said means actuating said last named operating means ineffective.

14. In a motor vehicle control system having a transmission and a transmission control lever, a throttle actuating member, brakes, a clutch, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, a solenoid to operate said last named connecting means, a circuit including said solenoid, a pair of parallel circuits connected to said circuit, a triplicate of switches in one of said parallel circuits, a normally open first switch, means to close said first switch when said first power operable means are connected to said source, means to close the second of said switches when the speed of the vehicle is at a predetermined minimum and the third of said switches being open when said transmission lever is neutrally positioned, and a switch in said other parallel circuit, said last named switch being manually operable to permit said solenoid to become operative independently of said switches in said first named parallel circuit and independently of the operation of said first power operable means, the vehicle speed, and the position of said transmission lever.

15. In a motor vehicle control system having a transmission and a transmission control lever, a throttle actuating member, brakes, a clutch, first power operable means to actuate said brakes, second power operable means to disengage said clutch, a source of power, means to connect said first power operable means and said source, an operator control, means connecting said operator control to said throttle actuating member to permit limited movement of said operator control independently of said throttle actuating member, means in control of said first-named connecting means to cause said connecting means to be actuated during said limited movement only, means to connect said second power operable means to said source, a solenoid to actuate said last named connecting means, a circuit including said solenoid, said circuit including a master switch, a pair of parallel circuits connected to said circuit, a triplicate of switches in one of said parallel circuits, means to close the first of said triplicate of switches when said first power operable means are connected to said source, means to close the second of said switches when the vehicle speed is at a predetermined minimum, and the third of said switches being open when said transmission lever is neutrally positioned, and a switch in said other parallel circuit, said last named switch being manually operable to permit said last named parallel circuit to be closed independently of said switches in said first named parallel circuit and independently of the operation of said first power operable means, the vehicle speed and the position of said transmission lever.

HENRY W. STRUCK.